United States Patent [19]

Hulin et al.

[11] 4,442,711

[45] Apr. 17, 1984

[54] DEVICE FOR MEASURING THE FLOW OF FLUID IN A WELL

[75] Inventors: Jean-Pierre Hulin, Saint-Maur; Claude Fierfort, Lozere; Roger Coudol, Clamart, all of France

[73] Assignee: Schlumberger Technology Corporation, Houston, Tex.

[21] Appl. No.: 327,973

[22] Filed: Dec. 7, 1981

[30] Foreign Application Priority Data

Dec. 18, 1980 [FR] France .................. 80 26875

[51] Int. Cl.³ .............................. G01F 1/32
[52] U.S. Cl. .................... 73/155; 73/861.22
[58] Field of Search ............ 73/152, 155, 861.22, 73/861.24

[56] References Cited

U.S. PATENT DOCUMENTS

| | | |
|---|---|---|
| 2,809,520 | 10/1957 | Richard, Jr. . |
| 2,842,961 | 7/1958 | Doll . |
| 3,810,388 | 5/1974 | Cousins . |
| 4,003,253 | 1/1977 | Yard et al. . |

FOREIGN PATENT DOCUMENTS

| | | | |
|---|---|---|---|
| 2036200 | 12/1970 | France . | |
| 2359427 | 2/1978 | France . | |
| 2444260 | 7/1980 | France . | |
| 2038479 | 12/1979 | United Kingdom | 73/861.22 |

OTHER PUBLICATIONS

"The Vortex Flowmeter-Its Development and Characteristics", Medlock et al., *Australian Journal of Instrumentation and Control*, Apr. 1976, pp. 24-33.

*Primary Examiner*—Howard A. Birmiel

[57] ABSTRACT

The invention is related to a device for measuring the flowrate of fluid through a well.

The device according to the invention comprises an upper portion adapted for connection with a cable, two elongated side members, generally parallel to and spaced from each other, secured to the upper portion, a vortex generating assembly comprising at least one obstacle secured between said side members transversely of their longitudinal direcition, said side members having, at least in the region of said assembly, facing walls which are substantially planar, and a transducer responsive to the occurrence of vortices generated by said assembly, said transducer producing a signal indicative of said flowrate.

28 Claims, 5 Drawing Figures

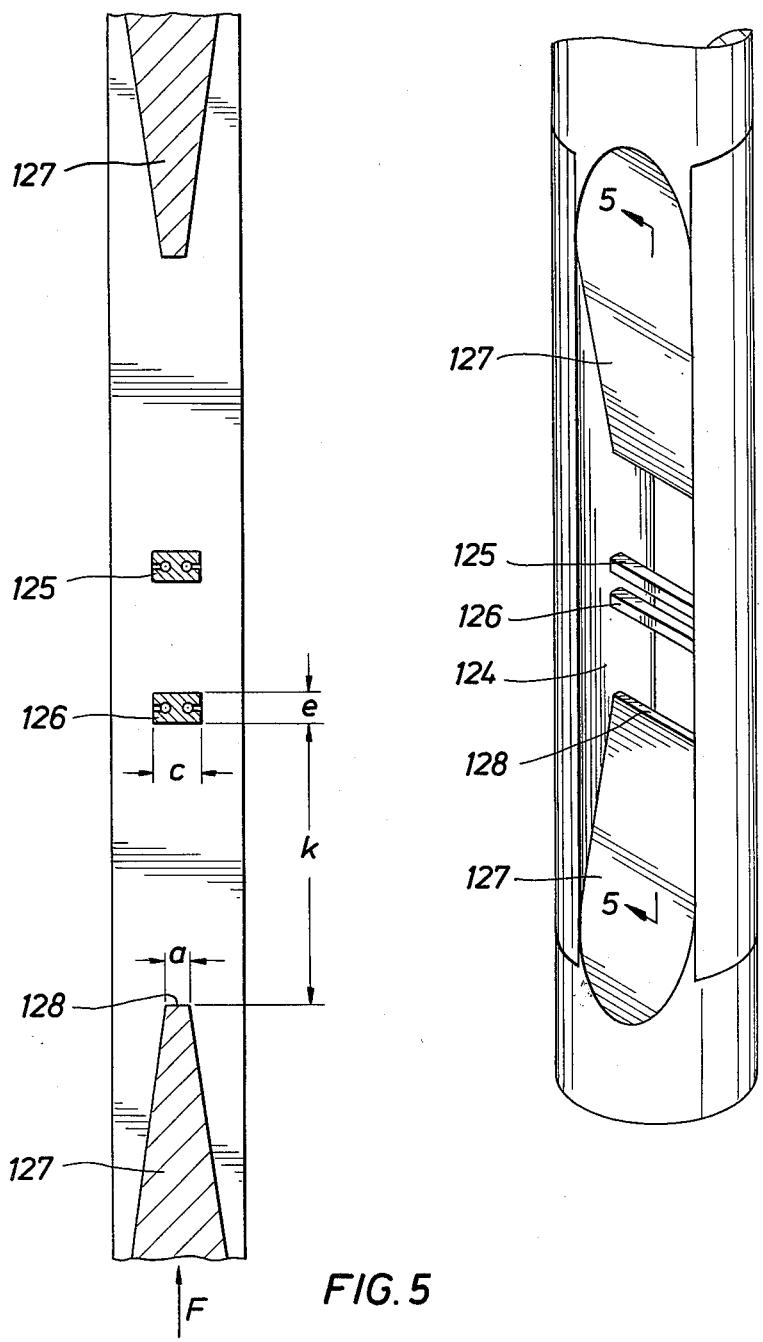

DEVICE FOR MEASURING THE FLOW OF FLUID IN A WELL

BACKGROUND OF THE INVENTION

The invention relates to the measurement of the flow of fluid through a well, especially a hydrocarbon well, so as to provide a flow profile of the well.

To measure the flow of fluid in a hydrocarbon producing well, a flowmeter is lowered into the well at the end of an electric cable which cable allows electrical transmission between the flowmeter and surface equipment.

Flowmeters presently used for this type of measurement are essentially propeller-type flowmeters (French Pat. No. 2 036 200). These well-known apparatus exhibit a number of drawbacks.

From the viewpoint of their principle, it should be noted that the frequency-flow characteristic depends on the properties of the fluid (viscosity, density), thus complicating the calibration of the apparatus.

From the practical viewpoint, the fact that the propeller is supported by bearings is a source of difficulty because bearings are subject to wear and to jamming by sand which may be carried by the fluid. At high flowrates, the propeller undergoes a high thrust which results in accelerated bearing wear. This wear is a major factor of inacurracy at low flowrates. Moreover, owing to solid friction at the bearings, the propeller does not begin to turn until after a given flowrate threshold is passed. Consequently, in a frequency-flow plot, the characteristic curve of the flowrate does not go through the origin of the coordinates.

A need was accordingly felt for the development of a flowmeter adapted to be used in a well, that is, capable of being moved in the well by means of a cable and of being made with a very small cross-section, and on the other hand, free from the above-described drawbacks, that is, having no moving part subject to wear and being easy to calibrate.

The vortex shedding flowmeters disclosed for instance in an article by R. S. Medlock "The Vortex Flowmeter—Its Development and Characteristics" published in Australian Journal of Instrumentation and Control, April 1976, pages 31-32, fulfill the second set of the requirements indicated above.

In these apparatus, an elongated vortex-generating obstacle is placed transversely with respect to the flow conduit with its ends secured to the conduit. The vortices are generated alternately on each side of the obstacle with a frequency proportional to the local velocity of the fluid and hence to the flowrate, forming what are called Karman vortex streets whose spatial period and front width depend only on the geometry of the obstacle. By associating with the obstacle a transducer sensitive to the passage of the vortices, an electric signal is obtained whose frequency is proportional to the flowrate.

Flowmeters of this type exhibit, over a wide range of flowrates, a frequency-flow characteristic of excellent linearity and practically independent of fluid density and viscosity. This characteristic moreover is not liable to be affected after repeated use, because of the absence of moving parts.

However, the fact that in these conventional apparatus, the obstacle is fixed to the conduit by its ends, precludes from contemplating their use in a well as any connection whatsoever between the obstacle and the wall of the well is obviously incompatible with such a use.

There are commericially available vortex shedding flowmeters adapted for lateral insertion inside a conduit marketed by the Eastech Company of Edison, New Jersey, U.S.A., under the references DS-2620 and DS-2630. In these apparatus, the obstacle crosses the interior of a tube diametrically, and means are provided for inserting and fixing the tube inside the conduit so that its axis is directed along the axis of the conduit, the obstacle thus being placed transversely with respect to the flow.

This configuration leads to the separation of the flow actually measured from the main flow owing to the "chimney" effect due to the tube. The secondary flow thus created is often not highly representative of the main flow as concerns the velocity profile, thus distorting the measurements.

Furthermore, beginning at the tube entry, is produced a turbulence capable of disturbing the creation of vortices due to the obstacle.

Japanese patent application No. 51-60104 discloses a comparable device for measuring the air flow in internal combustion engines.

French Pat. No. 2 359 427 describes a device for measuring the flow velocity of a fluid in a free medium, especially for measuring the velocity of a helicopter. This device comprises two parallel obstacles disposed transversely with respect to a flow channel. It is disclosed that the section of this channel may be of any shape, however its dimension in the direction parallel to the obstacles is preferably larger than its dimension in the direction normal to the obstacles. This flow channel can be equated to the tube of the above-cited DS-2620 and DS-2630 flowmeters.

U.S. Pat. No. 3,810,388 indicates that in the case of rectangular section conduits, the obstacles must have an efficient length smaller than the corresponding dimension of the conduit so that the ratio of the length to the front width of the obstacle does not exceed a given limit thus allowing a satisfactory vorticity. Provision is then made to equip the obstacle with end plates designed to prevent the fluid from flowing along the obstacle.

Further, French Pat. No. 2 444 260 indicates that it is advantageous to create a bidimensional flow around the obstacle by using a rectangular or substantially rectangular flow section. A prior art arrangement in which the obstacle has its ends respectively attached to two parallel walls secured in turn to the interior of the conduit is indicated as being disadvantageous, and this patent teaches an arrangement in which the obstacle has its ends secured to the conduit and walls parallel to the axial direction of the obstacle are disposed on both sides of the latter.

SUMMARY OF THE INVENTION

The device according to the invention for measuring the flowrate of fluid through a well comprises an upper portion adapted for connection with a cable, two elongated side members, generally parallel to and spaced from each other, secured to the upper portion, a vortex generating assembly comprising at least one obstacle secured between said side members transversely of their longitudinal direction, said side members having at least in the region of said assembly facing walls which are substantially planar, and a transducer responsive to the occurrence of vortices generated by said assembly, said transducer producing a signal indicative of said flowrate.

In the device according to the invention, the elongated side members have for their primary function to carry the vortex generating assembly. Further, their substantially planar inner walls constitute the "supports" required for a satisfactory vortex generation. In addition, these side members form an open structure and create no division within the flow section, so that the flow actually measured is not distinct from the main flow.

A lower portion is suitably connected to the ends of the side members away from the upper portion, and means are provided for tranquillizing the flow about the vortex generating assembly so that the velocity profile of the flow section at the level of said assembly is as close as possible to the velocity profile that would exist in the absence of the measuring device. Such tranquillizing means preferably comprise two profiles extending between the side members respectively from the upper and the lower portion, each profile tapering towards the vortex generating assembly to an end portion having generatrices normal to the longitudinal direction of the side members, the profiles being in symmetrical arrangement in relation to said assembly.

Preferably, said profiles are designed to produce a controlled turbulence upstream of the vortex generating assembly. Such a turbulence enhances the vortex generating capacity of the device at low flowrates. For this purpose, it is convenient that the profiles have a substantially trapezoidal section in said longitudinal direction.

Preferably, said transducer is a differential pressure transducer mounted in the upper portion and connected to two orifices leading out onto the opposite faces, parallel to the longitudinal direction of the side members, of the obstacle via respective conduits provided in the side members.

The invention will be better understood through the following description given with reference to the appended drawings.

BRIEF DESCRIPTION OF THE DRAWINGS

In the drawings:

FIG. 4 shows in perspective, in large scale, the central part of the sonde of FIG. 1 in accordance with another embodiment of the invention;

FIG. 5 is a longitudinal sectional view, in large scale, along plane V—V of FIG. 4.

DESCRIPTION OF THE PREFERRED EMBODIMENTS

Figure 1:
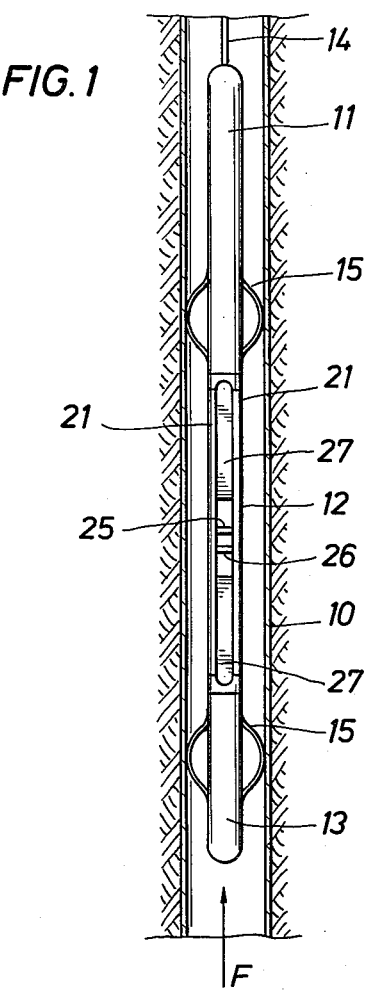
FIG. 1 represents a logging sonde for flowrate measurement in a hydrocarbon well.

FIG. 1 represents a sonde adapted to flowrate measurement in a well 10. The well 10 is a hydrocarbon producing well in which the fluid flows upward as represented by the arrow F.

The sonde, of generally circular section, comprises an upper part 11, a central part 12 and a lower part 13 fixed rigidly end to end. The central part 12 which will be described in detail below serves to create vortex streets and to detect the passage of these vortices. The upper part 11 is suspended from a cable 14 which connects the sonde mechanically and electrically to a surface equipment, not shown in FIG. 1. This surface equipment includes, in a conventional manner, a winch for reeling and unreeling the cable 14 and signal processing and recording means.

The upper part 11 contains a transducer which produces a detection signal, and circuits which process this signal for its transmission via the cable 14.

The lower part 13 acts, by its own weight, to facilitate the lowering of the sonde in the well against the pressure of the fluid.

Centering elements 15 are fixed respectively on the upper part 11 and on the lower part 13, symmetrically in relation to the central part 12. These centering elements are found conventionally in logging apparatus and need not be described here in detail. They allow the centering of the sonde in relation to the cylindrical wall of the well—casing or production string—so that the flow velocity measured is indeed the velocity in the central flow zone.

Figure 2:
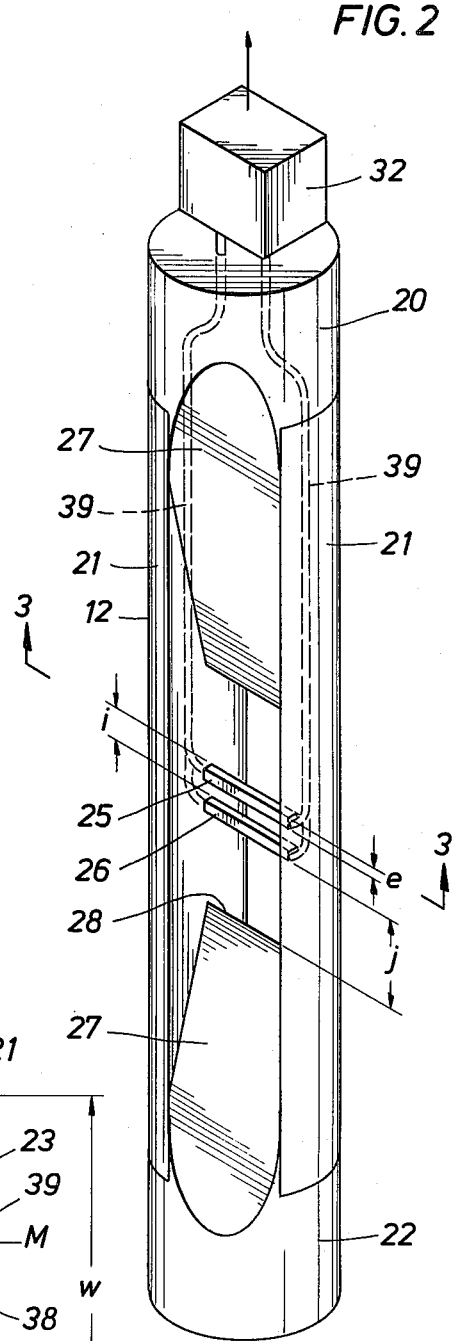
FIG. 2 shows in perspective, in large scale, the central part of the sonde of FIG. 1 in accordance with one embodiment of the invention.
Figure 3:
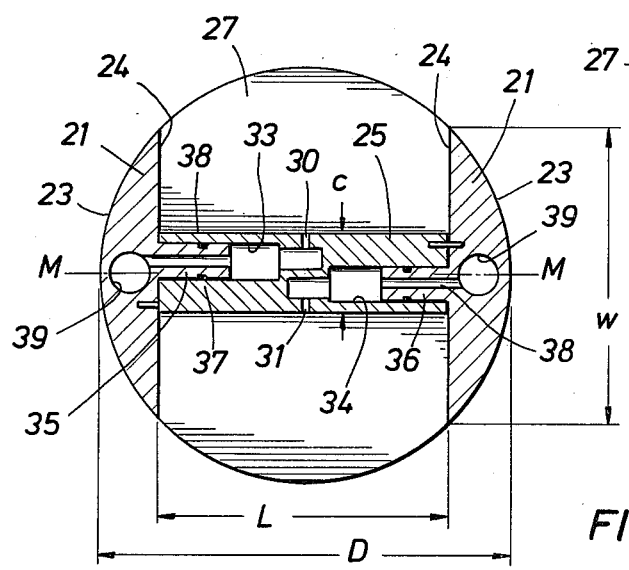
FIG. 3 is a cross sectional view along the plane III—III of FIG. 2.

The central part 12 is represented in a larger scale in FIG. 2, and FIG. 3 shows a cross-section thereof.

The central part includes an upper end piece 20 to which are fixed two parallel elongated side members 21 directed along the flow path, at the opposite ends of which is fixed a lower end piece 22. The upper and lower parts 11 and 13 are fixed respectively to the end parts 20 and 22. The attachment between the side members 21 and the end pieces is achieved by any suitable means, for example by screws not shown.

The end pieces 20 and 22 have a circular section of diameter D and the outer walls 23 of the side members 21 constitute circular sectors of the same diameter D lined up exactly with the end pieces.

On the other hands, the side members have inner walls 24 which are flat and parallel, separated by a distance L equal to about 0.7 D, D being defined as above.

Between the side members 21 are fixed two vortex-generating elongated members 25,26, hereinafter called obstacles. The obstacles 25,26 have identical rectangular sections. They are placed perpendicular to the inner walls 24 and symmetrically in relation to the median plane M of the walls 24 which is parallel to the flow.

The appropriate proportions for the obstacles 25,26 are the following: the ratio between the front width c (dimension parallel to walls 24 of the rectangular face transverse to flow) and the length (dimension transverse to flow and transverse to walls 24) of each obstacle, equal to the distance L between the walls 24, is about 0.30 and the ratio between the front width c and the thickness e (dimension in the direction of flow) is about 3/2. These preferred values are not limitative and the c/L ratio can range from 0.20 to 0.40.

The arrangement with two obstacles is known to provide a stronger vorticity than with a single obstacle. In a suitable manner, the interval i between the upper edges of the obstacles 25 and 26 is within the range of 4 e to 6 e and preferably about 5 e, e being the above-mentioned thickness.

It should be pointed out that the inner walls 24 of the side members constitute satisfactory "supports" for the formation of vortices. This supporting function would also be fulfilled if the walls 24 are substantially planar, for instance slightly convex, instead of being strictly planar.

Moreover, in order for the walls 24 to optimally meet this requirement, they should have a width w (dimension transverse to flow) at least equal to the width of the wake created by the obstacles. The width of this wake depend only on the shape of the obstacles and on their front width c, and is about 2 c with obstacles of rectangular section. In the above-described embodiment, the width w is of the same order as the length L of each obstacle and with c/L=0.30, the width c is about 3 c, that is, 1.5 times the above-mentioned minimum value.

Each of the end pieces 20,22 is extended in the direction of the obstacles 25,26 by a wedge-shaped profile 27 which extends between the side members 21. The profiles 27 constitute a symmetrical assembly in relation to the obstacles 25,26.

In the embodiment of FIG. 2, each profile 27 has a triangular section and tapers as of the respective end piece, of circular section, up to an edge 28 parallel to the obstacles 25, 26 and located in the median plane M of the walls 24 of the side members. The edges 28 are located at a distance j from the adjacent obstacle substantially equal to twice the interval in between the down-stream faces of the obstacles, that is 10 e, the distance j being at least equal to i.

The profiles 27 serve to minimize spurious turbulences due to the separation of the boundary layer on the end piece located upstream of the obstacles, i.e. the lower piece 22 in the case of upward flow. In other words, this arrangement minimizes the disturbances, due to the presence of the device, to the velocity profile of the flow section at the level of the obstacle. The angle of about 5° between each face of a profile 27 and the corresponding end piece allows a suitable tranquillization of the flow while avoiding excessive elongation of the central part 12. This amounts to an apex angle of about 10° for the profiles 27.

It will be noted that, thanks to the perfect symmetry of the geometry of the obstacles 25,26 and of the profiles 27, the device is suitable from the hydraulic viewpoint for a producing well (fluid flowing upward) as well as an injection well (fluid flowing downward).

FIGS. 4 and 5 show a modified embodiment in which instead of profiles of triangular section, a truncated form is used, i.e. profiles 127 of trapezoidal section also symmetrical in relation to obstacles 125,126 with the same apex angle of about 10°. The distance k between the end surface 128 of trapezoidal-section profiles 127 and the adjacent obstacle is of the same order as the distance j in the case of triangular-section profiles, that is, at least 5 e and preferably about 10 e.

An advantage of this truncated configuration is that it enables a limited turbulence to be created in stable manner upstream of the obstacles, which configuration enhances the vorticity at low flowrates. On the other hand, the truncated profiles have a flow tranquillizing effect which is practically as good as that provided by the triangular-section profiles.

Another advantage is that the overall length of the device can be reduced.

The end surface 128 has suitably a dimension a, parallel to the walls 124 of the side members, which is about c/2, c being the front width of the obstacles.

The detection of the passage of vortices shed alternately on each side of the obstacle 25 is achieved by two pressure tapping orifices 30,31 leading onto the opposite faces, parallel to the flow, of the obstacle 25. These two orifices are connected to a differential pressure transducer 32 represented schematically in FIG. 2 and contained, as indicated above, in the upper part 11. The transducer 32 can be a variable reluctance magnetic transducer such as the model DP9 of the company Validyne of Northridge, Calif., United States of America.

In the example shown, the connection between the orifices 30,31 and the transducer 32 is provided in the following manner.

The obstacle 25 comprises two bores 33,34 directed along its length and formed from its opposite ends. The bores 33,34 are extended by sections of smaller diameter which communicate respectively with the orifices 30,31. The bores 33,34 also make it possible to fit the obstacle on two dowels 35,36 formed or fixed respectively on the side members 21, each dowel receiving a seal 37 in a groove. The dowels are pierced with central holes 38 which place in communication the bores 33,34 respectively with conduits 39 formed in the side members 21 and in the upper end piece 20, and connected to the transducer 32.

The upstream obstacle 26 is assembled in the same manner as the obstacle 25 on dowels connected to the side members 21.

Adaptation to measurement in an injection well implies that the obstacles 25 and 26 can exchange their functions. For this purpose, the conduits 39 are extended up to the obstacle 26, as shown in FIG. 2, and obstacles of identical form are used, the orifices of the upstream obstacle being closed off by means of removable plugs so that only those of the downstream obstacle serve as pressure taps.

As concerns the transducer 32, it should be noted that it is placed inside a chamber filled with inert fluid placed in pressure equilibrium with the fluid of the well by a compensation piston. This is a conventional arrangement in logging sondes for hydrocarbon wells and need not be described in greater detail here. It prevents the transducer from having to support the high pressure of the well fluid, without changing the result of the measurement, as the measured parameter is the difference between the pressures taken at the opposite faces of the obstacle.

The transducer 32 receives an excitation signal of constant frequency which is amplitude-modulated by the variations in the measured parameter, namely the difference between the pressures on the opposite faces, parallel to the flow, of the downstream obstacle. A preamplification and demodulation unit, not shown, is associated with the transducer 32 and delivers a composite signal whose useful component has a frequencey f equal to the frequency of vortex generation from a given face of the obstacel.

The extraction of frequency f and the derivation of the flowrate are carried out by the processing means of the surface equipment. For deriving the flowrate, one takes into account the speed at which the device is moved in the well, which speed is determined by measuring the displacement of the cable. This speed is to be added to the velocity "seen" by the device, which is proportional to frequency f, to derive the actual flow velocity. The flowrate is then derived from this actual velocity with the knowledge of the area of the well at the considered depths.

We claim:

1. A device for measuring the flowrate of fluid through a well, comprising an upper portion adapted for connection with a cable, two elongated side members, generally parallel to and spaced from each other and secured to said upper portion, a vortex generating assembly including at least one obstacle secured between said side members transversely of their longitudinal direction, said side members having, at least in the region of said assembly, facing walls which are substantially planar, defining an elongated structure substantially open along its length to the flow of fluid in the well when inserted on the cable into the well, and a transducer responsive to the occurence of vortices generated by said assembly for producing a signal indicative of said flowrate.

2. A device according to claim 1, wherein said walls of said side members have a width at least equal to the width of the wake formed by the vortices generated by said assembly.

3. A device according to claim 1 or 2, further comprising a lower portion connected to the ends of said side members away from said upper poriton.

4. A device according to claim 3, comprising tranquillizing means for tranquillizing the flow about said vortex generating assembly.

5. A device according to claim 4, wherein said tranquillizing means comprises two projections extending between said side members respectively from said upper and lower portions, each projection tapering toward said vortex generating assembly to respective end portions having generatrices normal to the longitudinal direction of said side members, said projections being in symmetrical arrangement in relation to said assembly.

6. A device according to claim 5, wherein said projections further comprise means for producing a controlled turbulence upstream of said vortex generating assembly.

7. A device according to claim 6, wherein said profiles each have a substantialy trapezoidal section in said longitudinal direction.

8. A device according to claim 7, where each said projection end portion has a dimension in a transverse direction with respect to said generatrices which is about c/2, c being the front width of said at least one obstacle.

9. A device according to claim 5, wherein said projections have an apex angle of about 10 degrees.

10. A device according to claim 1, wherein said transducer is a differential pressure transducer mounted in the upper portion, and further comprising means defining two orifices connected to said differential pressure transducer via respective conduits provided in said side members, said orifices leading out into opposite faces of said obstacle, and said faces being parallel to the longitudinal direction of said side members.

11. A device according to claim 10, further comprising two dowels respectively provided on the side members, and said obstacle being fitted on said dowels.

12. A device according to claim 1, wherein said vortex generating assembly comprises two obstacles of identical rectangular sections.

13. A device according to claim 12, wherein the interval between the upstream faces of said obstacles ranges from 4 e to 6 e, e being the dimension of each obstacle in the longitudinal dimension of said side members.

14. A device according to claim 4, wherein the spacing between the end portion of each projection and the adjacent obstacle is about 10 e, e being the dimension of said obstacle in the longitudinal dimension of said side members.

15. A method of measuring the flowrate of fluid through a well, comprising:

(a) suspending a vortex generating assembly within the well, the assembly including at least one obstacle secured between two elongated side members which are generally parallel to and spaced from each other, with the obstacle transverse to their longitudinal direction, the side members having, at least in the region of said assembly, facing walls which are substantially planar, and the side members being secured to an upper portion of the overall measuring device, and defining an elongated structure substantially open along its length to the flow of fluid in the well, which in turn is suspended within the well from a cable, and (b) producing a signal indicative of the flowrate with a transducer responsive to the occurrence of vortices generated by the assembly.

16. The method of claim 15 wherein the walls of the side members have a width at least equal to the width of the wake formed by the vortices generated by the assembly.

17. The method of claim 15 or 16 further comprising tranquillizing the flow about the vortex generating assembly.

18. The method of claim 17 wherein said tranquillizing step is performed by at least one projection extending between the side members and tapering toward the vortex generating assembly to an end portion having a generatrix normal to the longitudinal direction of the side members.

19. The method of claim 18 further comprising producing a controlled turbulence with the projection upstream of the vortex generating assembly.

20. The method of claim 19 wherein the projection has a substantially trapezoidal section in the longitudinal direction.

21. The method of claim 20 wherein the projection end portion has a dimension in a transverse direction with respect to the generatrix which is about c/2, c being the front width of the obstacle.

22. The method of claim 18 wherein the projection has an apex angle of about 10 degrees.

23. The method of claim 15 wherein the transducer is a differential pressure transducer connected to two orifices leading out onto opposite faces of the obstacle, where the faces are parallel to the longitudinal direction of the side members.

24. The method of claim 15 wherein the vortex generating assembly is two obstacles of identical rectangular sections.

25. The method of claim 24 wherein the interval between the upstream faces of the obstacles ranges from 4 e to 6 e, e being the dimension of each obstacle in the longitudinal dimension of the side members.

26. The method of claim 18 wherein the spacing between the end portion of the profile and the adjacent obstacle is about 10 e, e being the dimension of the obstacle in the longitudinal dimension of the side members.

27. A device for measuring the flowrate of fluid through a well, comprising:

(a) an upper portion adapted for connection with a cable, (b) two elongated side members generally parallel to and spaced from each other and secured to said upper portion, (c) a vortex generating assembly including two obstacles of identical rectangular sections secured between said side members transversely of their longitudinal direction, said side members having, at least in the region of said assembly, facing walls which are substantially planar and have a width at least equal to the width of the wake formed by the vortices generated by said assembly, (d) a differential pressure transducer mounted in said upper portion and responsive to the occurrence of vortices generated by said assembly for producing a signal indicative of said flowrate, (e) a lower portion connected to the ends of said side members away from said upper portion, (f) tranquillizing means for tranquillizing the flow about said vortex generating assembly, said tranquillizing means including two projections having means for producing a controlled turbulence upstream of said vortex generating assembly, said projections extending between said side members respectively from said upper and lower portions, each projection tapering toward said vortex generating assembly to respective end portions having generatrices normal to the longitudinal direction of said side members, said profiles being in symmetrical arrangement in relation to said assembly, and each having a substantially trapezoidal section in said longitudinal direction and an apex angle of about 10 degrees, each said projection end portion having a dimension in a transverse direction with respect to said generatrices which is about $c/2$, c being the front width of said at least one obstacle, (g) said differential pressure transducer including means defining two orifices connected to said differential pressure transducer via respective conduits provided in said side members, said orifices leaading out into opposite faces of said obstacle, and said faces being parallel to the longitudinal direction of said side members, and (h) the interval between the upstream faces of said obstacles ranging from 4 e to 6 e, e being the dimension of each obstacle in the longitudinal dimension of said side members, and the spacing between the end portion of each projection and the adjacent obstacle being about 10 e.

28. A method for measuring the flowrate of fluid through a well, comprising:

(a) suspending a vortex generating assembly within the well, the assembly including two obstacles of identical rectangular sections secured between two elongated side members which are generally parallel to and spaced from each other, with the obstacle transverse to their longitudinal direction, the interval between the upstream faces of the obstacles ranging from 4 e to 6 e, e being the dimension of each obstacle in the longitudinal dimension of the side members, the side members having at least in the region of the assembly, facing walls which are substantially planar and have a width at least equal to the width of the wake formed by the vortices generated by the assembly, and the side members being secured to an upper portion of the overall measuring device, which in turn is suspended within the well from a cable, (b) producing a signal indicative of the flowrate with a transducer responsive to the occurrence of vortices generated by the assembly, the transducer being a differential pressure transducer connected to two orifices leading out onto opposite faces of the obstacle where the faces are parallel to the longitudinal direction of the side members, (c) tranquillizing the flow about the vortex generating assembly using at least one projection extending between the side members and tapering toward the vortex generating assembly to an end portion having a generatrix normal to the longitudinal direction of the side members, the spacing between the end portion of the projection and the adjacent obstacle being about 10 e, and (d) producing a controlled turbulence with the projection upstream of the vortex generating assembly, the projection having a substantially trapezoidal section in the longitudinal direction, an apex angle of about 10 degrees, and the projection end portion having a dimension in a transverse direction with respect to the generatrix which is about $c/2$, c being the front width of the obstacle.

* * * * *